United States Patent
Ohanian, III et al.

(10) Patent No.: US 12,422,317 B2
(45) Date of Patent: Sep. 23, 2025

(54) FIBER OPTIC SENSOR EGRESS/INGRESS RUGGEDIZATION FOR FLEXIBLE WOVEN STRUCTURES

(71) Applicant: Luna Innovations Incorporated, Roanoke, VA (US)

(72) Inventors: Osgar John Ohanian, III, Blacksburg, VA (US); James Craig Kitchin, Salem, VA (US); Susan Mae Rankin Pope, Christiansburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 363 days.

(21) Appl. No.: 18/128,365

(22) Filed: Mar. 30, 2023

(65) Prior Publication Data
US 2024/0328877 A1 Oct. 3, 2024

(51) Int. Cl.
*G01L 1/24* (2006.01)
*D03D 1/00* (2006.01)
(Continued)

(52) U.S. Cl.
CPC ............ *G01L 1/242* (2013.01); *D03D 1/0088* (2013.01); *D03D 11/00* (2013.01); *D03D 15/547* (2021.01)

(58) Field of Classification Search
CPC ...... G01L 1/242; D03D 1/0088; D03D 11/00; D03D 15/547; D10B 2401/20
See application file for complete search history.

(56) References Cited

U.S. PATENT DOCUMENTS

| | | | | |
|---|---|---|---|---|
| 5,604,836 A | * | 2/1997 | Dunphy | G02B 6/3644 385/138 |
| 5,733,043 A | * | 3/1998 | Yamada | G01J 5/041 374/E1.017 |

(Continued)

FOREIGN PATENT DOCUMENTS

WO 2021/041605 3/2021

OTHER PUBLICATIONS

International Search Report and Written Opinion of the International Searching Authority for PCT/US2024/020363 mailed Jul. 1, 2024, 15 pages.

*Primary Examiner* — Freddie Kirkland, III
(74) *Attorney, Agent, or Firm* — NIXON & VANDERHYE P.C.

(57) ABSTRACT

An apparatus comprises a flexible woven structure including an egress and/or ingress location at an external surface of the flexible woven structure. A fiber optic sensor is embedded in the flexible woven structure to allow the fiber optic sensor to detect one or more of strain, temperature, vibration, acoustics, 3-dimensional shape and/or pressure on the flexible woven structure. The fiber optic sensor extends out of the flexible woven structure at the egress and/or ingress location for connection to a connector or a termination. First thread stitches fasten the fiber optic sensor and any protective coatings, tubing, or conduit to the external surface of the flexible woven structure near the egress and/or ingress location. An optional reinforcement patch may cover the egress and/or ingress location and a portion of fiber optic sensor that extends out of the flexible woven structure at the egress and/or ingress location. Second thread stitches fasten the reinforcement patch to the external surface of the flexible woven structure to protect the fiber optic sensor and reduce bending and stress at the egress/ingress location.

21 Claims, 10 Drawing Sheets

(51) Int. Cl.
    *D03D 11/00*     (2006.01)
    *D03D 15/547*     (2021.01)

(56) References Cited

U.S. PATENT DOCUMENTS

| | | |
|---|---|---|
| 6,173,090 B1 | 1/2001 | Simon et al. |
| 2002/0172470 A1 | 11/2002 | Johnson et al. |
| 2005/0259909 A1 | 11/2005 | Aldridge et al. |
| 2007/0293748 A1 | 12/2007 | Engvall et al. |
| 2016/0313201 A1 | 10/2016 | Lee et al. |
| 2022/0316865 A1 | 10/2022 | Ohanian, III et al. |

\* cited by examiner

FIBER OPTIC SENSOR EGRESS/INGRESS RUGGEDIZATION FOR FLEXIBLE WOVEN STRUCTURES

STATEMENT REGARDING FEDERALLY SPONSORED RESEARCH OR DEVELOPMENT

This invention was made with US Government support under Contract No. 80LARC20C0007, awarded by the National Aeronautics and Space Administration. The Government has certain rights to the invention.

The technical field relates to fiber optic sensors and applications that can use fiber optic sensors.

Many applications may benefit from having fiber optic sensors integrated into flexible woven structures for the purpose of structural health monitoring and identifying an occurrence, location, severity, and/or nature of damage to a structure. Flexible woven structures are assemblies of multiple filaments, which may be elements made up of long thin fibers or threads that may be singular or bound together into larger elements, that are further bound into larger assemblies, that may be bent into different shapes when in use. These flexible woven structures (such as webbing, straps, ropes, cords, textiles, fabric, any flexible material used for securing, holding together, or wrapping, etc.) may function as primary load-bearing structures or secondary structures, e.g., for reinforcement, strengthening, improving flexibility, reliability, lifetime, etc., for various applications such as inflatable space habitats, load handling straps, seat restraints, fabrics, clothing, civil structures for soil retention, rock fall mitigation, landslide detection, and other applications that use a woven configuration, e.g., for reinforcement, etc.

A fiber optic sensor integrated into a flexible woven structure needs to egress from the flexible woven structure and connect or couple to a sensing device like a fiber optic interrogator that measures strain and/or other parameters based on optical signals detected from the optical fiber sensor. However, fiber optic sensors are often damaged and are at least susceptible to damage at the optical fiber sensor egress from the flexible woven structure as well as at a fiber optic sensor ingress to the flexible woven structure. The egress/ingress point of the sensor in the woven structure may cause a stress concentration in the sensor or have a high probability to cause a sharp bend in the sensor that can damage the sensor. When damage occurs to the fiber optic sensor at an egress or ingress location, the sensor measurements are corrupted or even eliminated if the optical fiber breaks at the egress or ingress location.

Ruggedized fiber optic sensor ingress and/or egress from flexible woven structures is needed.

SUMMARY

At least some examples provide an apparatus that includes a flexible woven structure having an egress and/or ingress location at an external surface of the flexible woven structure. A fiber optic sensor is embedded in the flexible woven structure to allow the fiber optic sensor to detect one or more of strain, temperature, vibration, acoustics, 3-dimensional shape, and/or pressure on the flexible woven structure. The fiber optic sensor extends out of the flexible woven structure at the egress and/or ingress location for connection to a connector or a termination. First thread stitches fasten the fiber optic sensor to the external surface of the flexible woven structure near the egress and/or ingress location. A reinforcement patch covers the egress location and a portion of fiber optic sensor that extends out of the flexible woven structure at the egress location. Second thread stitches fasten the reinforcement patch to the external surface of the flexible woven structure.

At least some examples provide a system including a flexible woven structure having an egress and/or ingress location at an external surface of the flexible woven structure. A fiber optic sensor is embedded in the flexible woven structure to allow the fiber optic sensor to detect one or more of strain, temperature, vibration, acoustics, 3-dimensional shape, and/or pressure on the flexible woven strap. The fiber optic sensor extends out of the flexible woven strap at the egress and/or ingress location for connection to a connector or a termination. First thread stitches fasten the fiber optic sensor to the external surface of the flexible woven strap near the egress and/or ingress location. A reinforcement patch covers the egress and/or ingress location and a portion of fiber optic sensor that extends out of the flexible woven structure at the egress location. Second thread stitches fasten the reinforcement patch to the external surface of the flexible woven structure. A fiber optic interrogator is optically coupled to the fiber optic sensor and is configured to measure one or more of strain, temperature, vibration, acoustics, 3-dimensional shape, and/or pressure on the flexible woven structure.

At least some examples provide a method including embedding at least one fiber optic sensor within a flexible woven structure to detect one or more of strain, temperature, vibration, acoustics, 3-dimensional shape, and/or pressure on the flexible woven structure. The method also includes making a fiber optic egress and/or ingress in the flexible woven structure at an egress and/or ingress location at an external surface of the flexible woven structure extending the at least one fiber optic sensor out of the flexible woven structure at the egress and/or ingress location for connection to a connector or a termination. The method also includes fastening the at least one fiber optic sensor to the external surface of the flexible woven structure near the egress and/or ingress location using first thread stitches and covering the egress and/or ingress location and a portion of the at least one fiber optic sensor that extends out of the flexible woven structure at the egress and/or ingress location with a reinforcement patch. The reinforcement patch is fastened to the external surface of the flexible woven structure using second thread stitches.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE FIGURES

These and other features and advantages will be better and more completely understood by referring to the following detailed description of example non-limiting illustrative embodiments in conjunction with the drawings of which.

DETAILED DESCRIPTION OF EXAMPLE EMBODIMENTS

Figure 1:
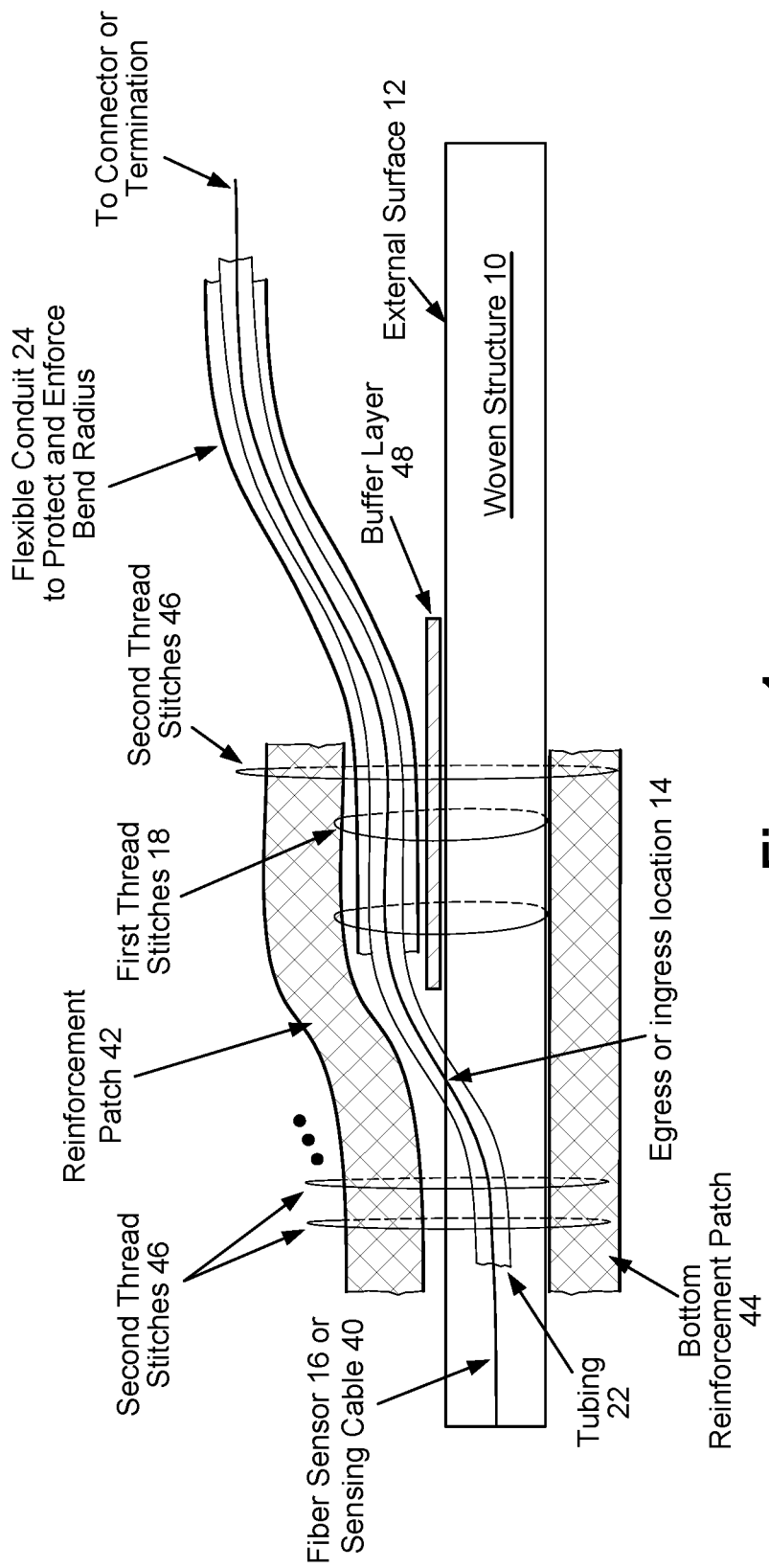
FIG. 1 shows a sideview of an example fiber optic sensor embedded in a flexible woven structure egressing from the flexible woven structure according to a further example egress and/or ingress ruggedization embodiment.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

One or more distributed sensing optical fibers useable for distributed optical sensing is embedded or integrated (e.g., woven) into a flexible woven structure. Each fiber optic sensor may detect one or more of strain, temperature, vibration, acoustics, 3-dimensional shape, and/or pressure on the flexible woven structure.

In some embodiments, a fiber optic sensor may be bonded, adhered, or impregnated with a polymer or an epoxy resin to create a bond or coupling between the fiber and the flexible woven structure so that strain may be transferred from the flexible woven structure to the sensing fiber. The fiber optic sensor may be bonded to the flexible woven structure with different types of polymers with characteristics that may affect the properties of the final structure. For example, a stiffer polymer tends to transfer the strain better than a softer polymer. But a tradeoff with a stiffer polymer is that the flexible woven structure may more readily stiffen to a point where it is less easily manipulated. This may be more of a problem in example applications which require the flexible woven structure to be folded for storage or transport. Softer polymers permit easier manipulation. A stiffer polymer also changes the stiffness of the structure that the flexible woven structure is built into and the overall material properties of the flexible woven structure. Non-limiting examples of flexible woven structures with fiber optic sensors are described in commonly-assigned PCT Appl. PCT/US2020/048103, filed on Aug. 27, 2020, and published as WO2021041605, the contents of which are incorporated herein by reference. However, such bonding is not required. Thus, in other embodiments, the fiber optic sensor is not bonded, adhered, or impregnated and is simply embedded in the flexible woven structure.

In an example embodiment, a distributed fiber optical sensor is embedded in a flexible woven structure. A strap is an example of a woven structure. The technology described in this application is not limited to woven straps and applies to all flexible woven structures.

The woven structure may be made of one material or a combination of materials. One example material that may be used is Kevlar. Other example materials include Vectran, Nylon, Polyester, cotton, and other synthetic and organic-based fibers.

Figure 11:
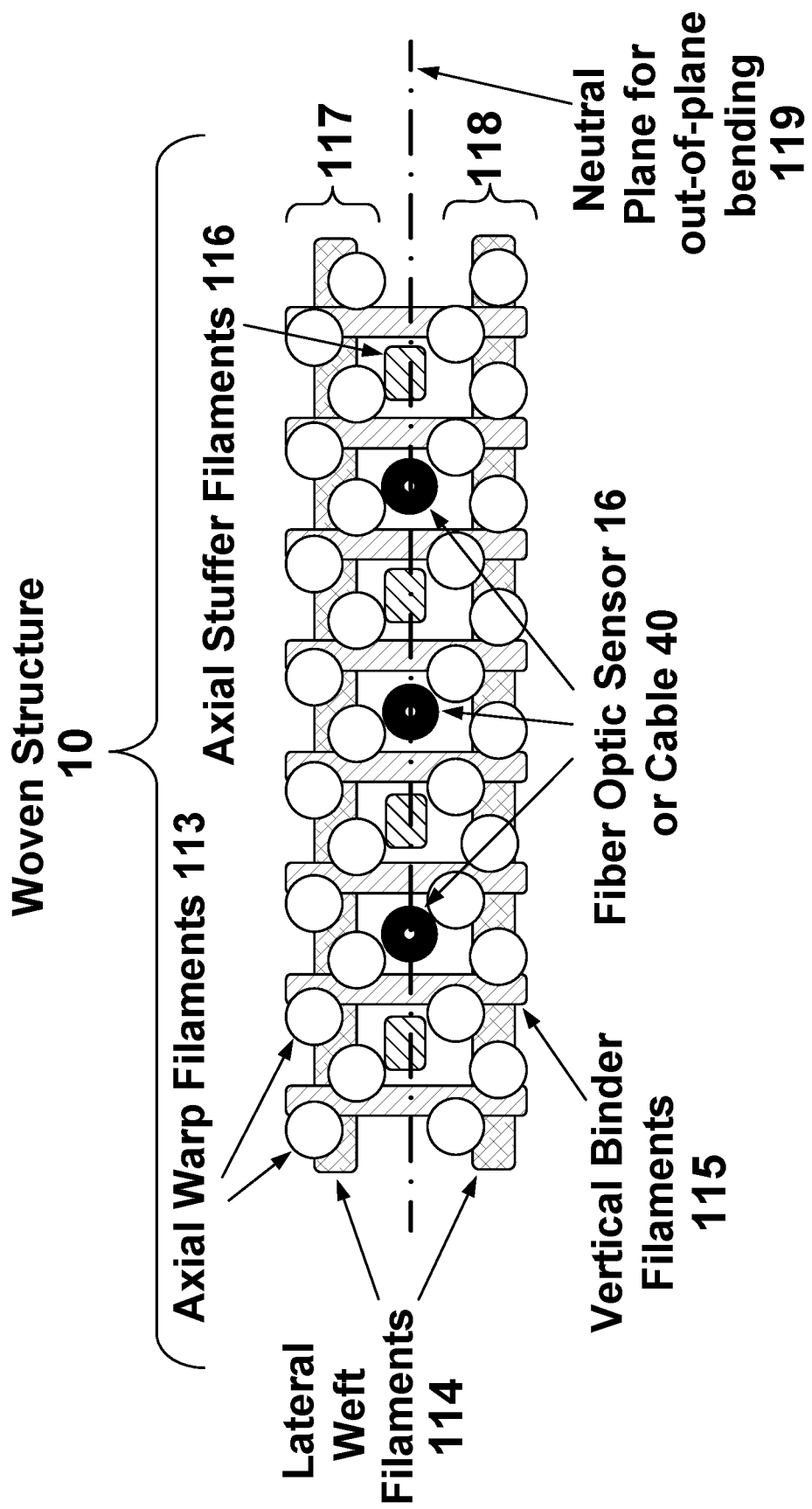
FIG. 11 shows an example woven structure that includes a first layer of axial wovens and lateral wovens and a second layer of axial wovens and lateral wovens, where the vertical wovens extend to couple the first layer and the second layer and one or more fiber optic sensors are embedded between the first layer and the second layer.

FIG. 1 shows a sideview of another example fiber optic sensor embedded in a flexible woven structure egressing from the flexible woven structure according to a further example egress and/or ingress ruggedization embodiment. An example flexible woven structure is shown in FIG. 11 and described later; other flexible woven structures may be used. A fiber optic sensor 16 or sensing cable 40 is embedded in a woven structure 10 as is a portion of an optional tubing 22 encasing the fiber optic sensor 16 to protect the fiber optic sensor 16 at an egress and/or ingress location 14. The sensing cable 40 may, for example, include multiple layers outside the glass fiber along with reinforcement like polymers, rubber, Kevlar strands, or metal tubing within the cable. The egress and/or ingress occurs approximately at an egress and/or ingress location 14 on an external surface 12 of the woven structure 10. The fiber optic sensor 16 and tubing 22 extend out of the woven structure 10 at the egress and/or ingress location 14 and insert into a flexible protective conduit 24 that may be constructed from metallic, polymer, or other materials. An initial portion of the flexible protective conduit 24 contacts an optional buffer layer 48 located on a portion of an external surface 12 proximate to the egress and/or ingress location 14, e.g., as shown. The buffer layer 48 may be flat or tubular, made of example materials Kevlar, Vectran, Nylon, Teflon, etc., and is used to eliminate contact between the protective conduit 24 and the external surface 12 of the woven structure 10 to avoid abrasion. In addition to the protective conduit 24 not contacting the woven structure 10, no adhesive is necessary for this design.

First thread stitches 18 encircle the flexible conduit 24 along the portion of the conduit that contacts the buffer layer 48 near the egress and/or ingress location 14. A first reinforcement patch 42 covers the egress and/or ingress location 14, the tubing 22, and the protective conduit 24 to one side of the egress and/or ingress location 14, and a portion of the external surface 12 on the other side of the egress and/or ingress location 14. In other embodiments, a bottom reinforcement patch 44 that is a companion to reinforcement patch 42 may be used to cover the opposite side of the woven structure 10; the bottom reinforcement patch 44 is not essential.

Two sets of second thread stitches 46 fasten the reinforcement patch 42 to the woven structure 10 (and the bottom reinforcement patch 44 if used), one set near one end of the reinforcement patch 42 and the other set near the opposite end of the reinforcement patch 42. The second thread stitches may, for example, encircle the fiber optic sensor or not. Although two sets of second thread stitches 46 are shown, the dots indicate second thread stitches 46 may extend for the full length or most of the length of the reinforcement patch 42 (and the bottom reinforcement patch 44 if used). Example stitching patterns for the reinforcement patch are shown in subsequent figures, but other stitching patterns than those shown may be used. The second thread stitches 46 may be made by hand or by machine, and the stitching material may be for example Nylon, Kevlar, or Vectran thread. Other suitable materials for the stitching threads may be used.

Figure 2:
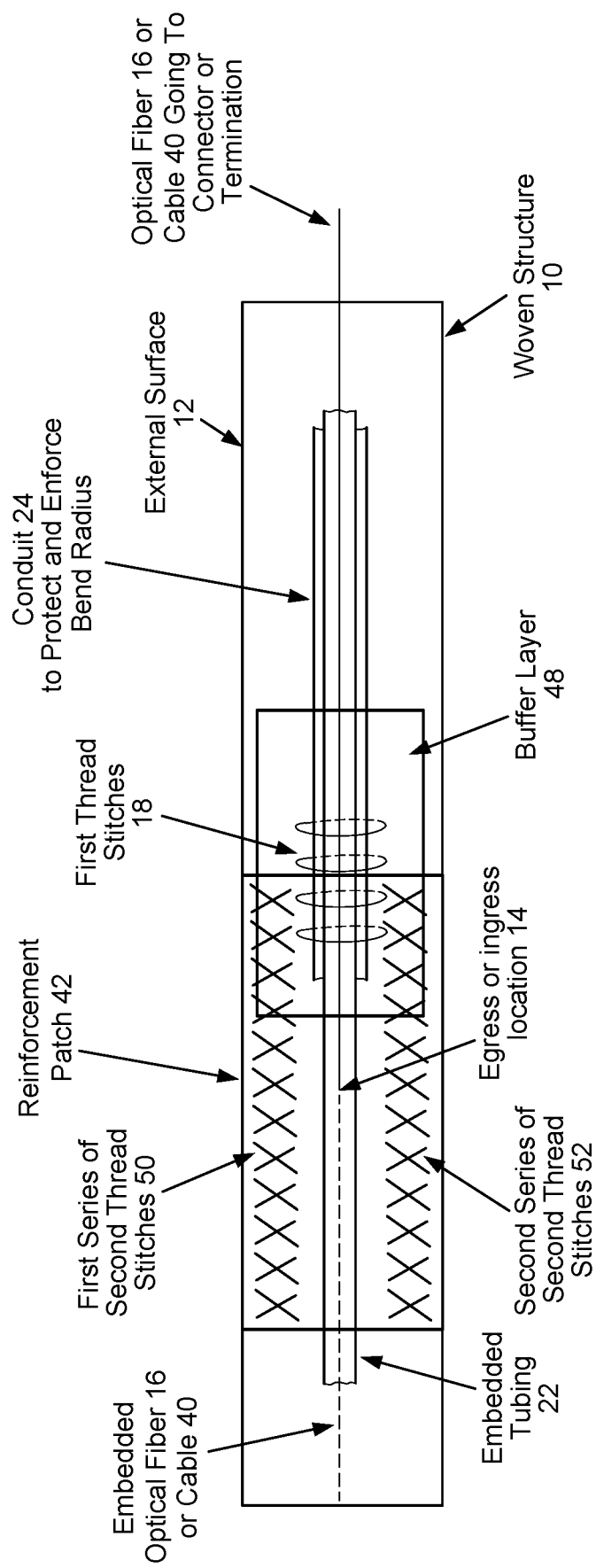
FIG. 2 shows a top view of an example fiber optic sensor embedded in a flexible woven structure egressing from the flexible woven structure according to the further example egress and/or ingress ruggedization embodiment in FIG. 1.

FIG. 2 shows a top view of an example fiber optic sensor embedded in a flexible woven structure egressing from and/or ingressing to the flexible woven structure according to the further example egress and/or ingress ruggedization embodiment of FIG. 1. Rather than encircling the protective conduit 24 as in FIG. 1, FIG. 2 shows an example where a first series of second stitches 50 extends along one side of the reinforcement patch 42 for substantially the length of the patch 42, and a second series of second stitches 52 extends along the other side of the reinforcement patch 42 for substantially the length of the patch 42. Some of the first thread stitches are covered by the reinforcement patch 42 and some of them continue beyond the reinforcement patch 42. In some embodiments, the second thread stitches 46 do not intersect the embedded fiber optic sensor 16 or cable 40 as this may be advantageous but does not preclude stitching directly over the embedded fiber optic sensor 16 or cable 40.

Figure 3B:
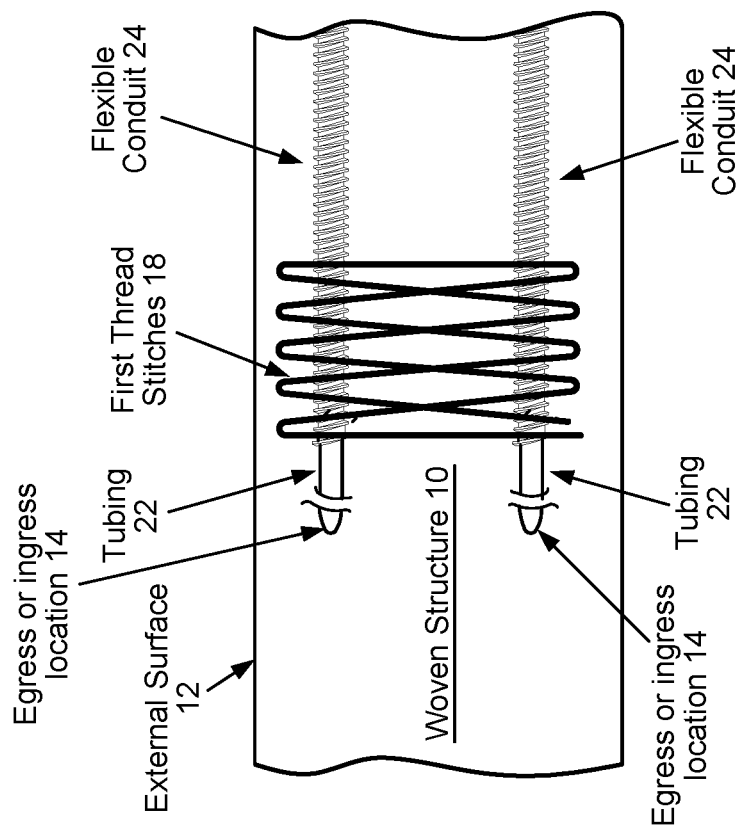
FIG. 3B shows a top view of two example fiber optic sensors embedded in a flexible woven structure egressing from the flexible woven structure according to a further example egress and/or ingress ruggedization embodiment applying first thread stitches to both fiber optic sensor together.
Figure 3A:
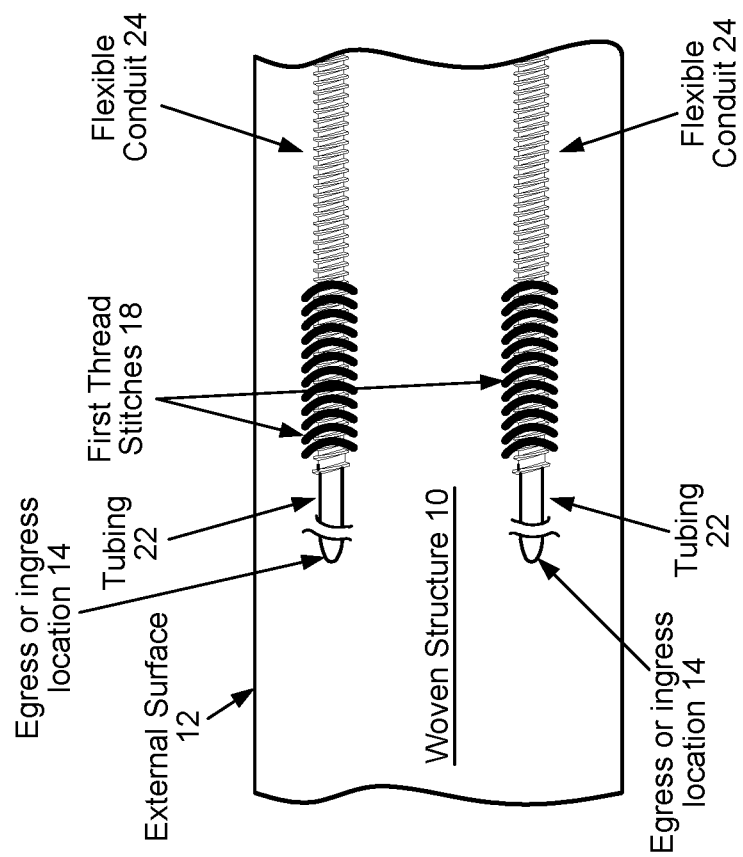
FIG. 3A shows a top view of two example fiber optic sensors embedded in a flexible woven structure egressing from the flexible woven structure according to a further example egress and/or ingress ruggedization embodiment applying first thread stitches to each fiber optic sensor individually.

FIG. 3A shows a top view of an example egress and/or ingress ruggedization embodiment with two example fiber optic sensors embedded in the flexible woven structure 10. Each fiber optic sensor is encased in tubing 22 a portion of which is also embedded in the woven structure 10 and the tubing extends from its respective egress and/or ingress location and inserts into a respective flexible protective conduit 24. Respective first thread stitches 18 fasten each flexible protective conduit 24 to the external surface 12 of the woven structure 10.

FIG. 3B shows a top view of an example egress and/or ingress ruggedization embodiment with two example fiber optic sensors embedded in the flexible woven structure 10. Each fiber optic sensor is encased in tubing 22 a portion of which is also embedded in the woven structure 10 and the tubing extends from its respective egress and/or ingress location and inserts into a respective flexible protective conduit 24. In contrast to individual respective first thread stitches for each protective conduit 24, in this example embodiment, first thread stitches 18 encircle both protective conduits 24 in a crisscrossing stitching pattern. Other stitching patterns may be used.

Figure 4:
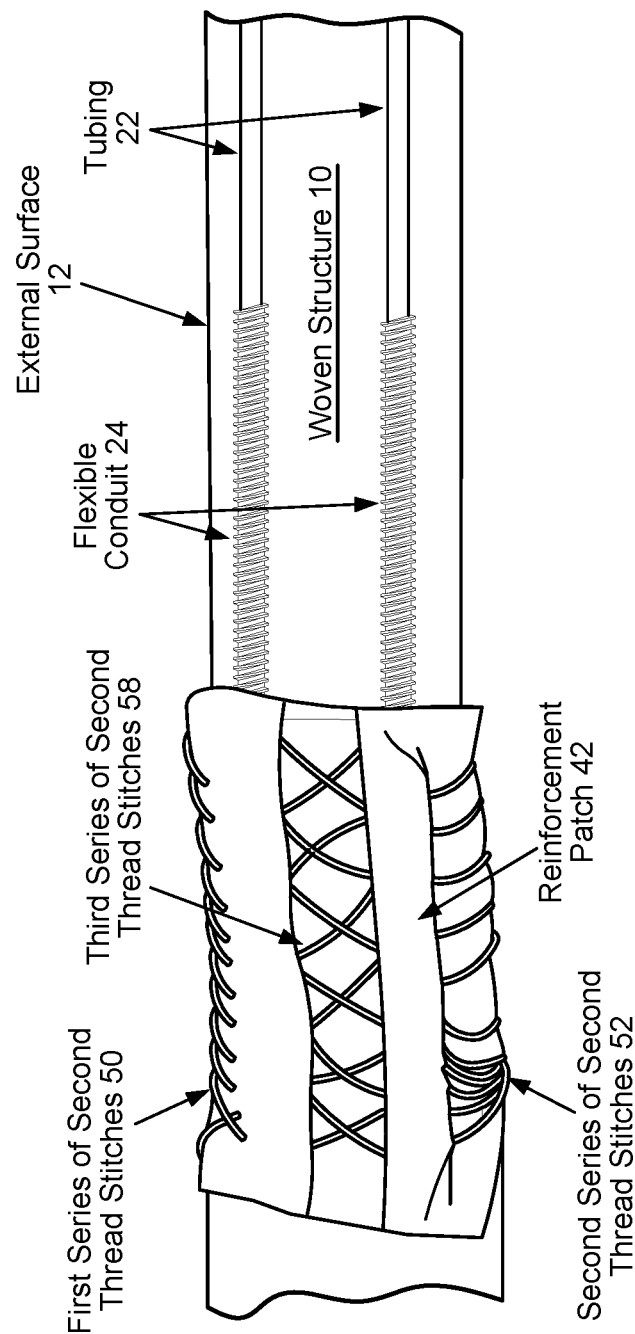
FIG. 4 shows a top view of two example fiber optic sensors embedded in a flexible woven structure egressing from the flexible woven structure according to a further example egress and/or ingress ruggedization embodiment employing reinforcement patches and additional, third thread stitches.

FIG. 4 shows a top view of two example fiber optic sensors embedded in a flexible woven structure egressing from the flexible woven structure according to a further example egress and/or ingress ruggedization embodiment employing reinforcement patches 42 and 44 and additional thread stitches. A third series of second thread stitches 58 are made through the reinforcement patch 42 (and optionally patch 44) in between the two protective conduits 44 over the egress and/or ingress location 14. A crisscrossing stitching pattern is shown but other stitching patterns may be used. In some applications, multiple series of stitches and/or multiple threads may be useful or necessary.

Figure 5:
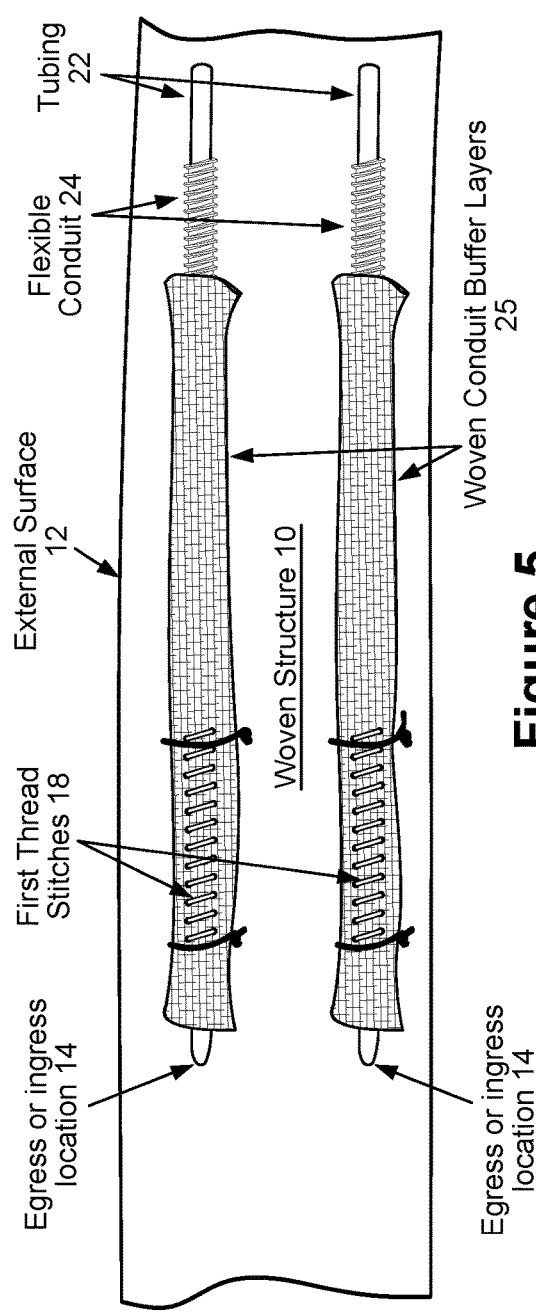
FIG. 5 shows a top view of two example fiber optic sensors embedded in a flexible woven structure egressing from the flexible woven structure according to a further example egress and/or ingress ruggedization embodiment employing woven conduits as the buffer layer surrounding each flexible conduit and tubing that contain an optical fiber.

FIG. 5 shows a further example egress and/or ingress ruggedization embodiment with a top view of two example fiber optic sensors embedded in the flexible woven structure 10 egressing from the flexible woven structure 10. Each fiber optic sensor is encased in tubing 22 a portion of which is also embedded in the woven structure 10 and the tubing extends from its respective egress and/or ingress location and inserts into a respective flexible protective conduit 24. In this example egress and/or ingress ruggedization embodiment, an initial portion of each protective conduit 24 extending from the egress and/or ingress location is surrounded by a buffer layer in a cylindrical woven conduit form and referred to as woven conduit buffer layer 25. The woven conduit buffer layers 25 may be made of the same or similar material as the woven structure 10 or a different material that is preferably low friction and/or abrasion-resistant, and it may be a sacrificial material. A series of first thread stitches 18 penetrates at least a part of each woven conduit buffer layer 25 and encircles and fastens the protective conduit 24 to the woven structure 24. The woven conduit buffer layers 25 provide a physical separation of the flexible conduit 24 which may be more rigid in nature than the woven structure 10 to avoid abrasion of the main load-bearing woven structure 10.

Figure 6:
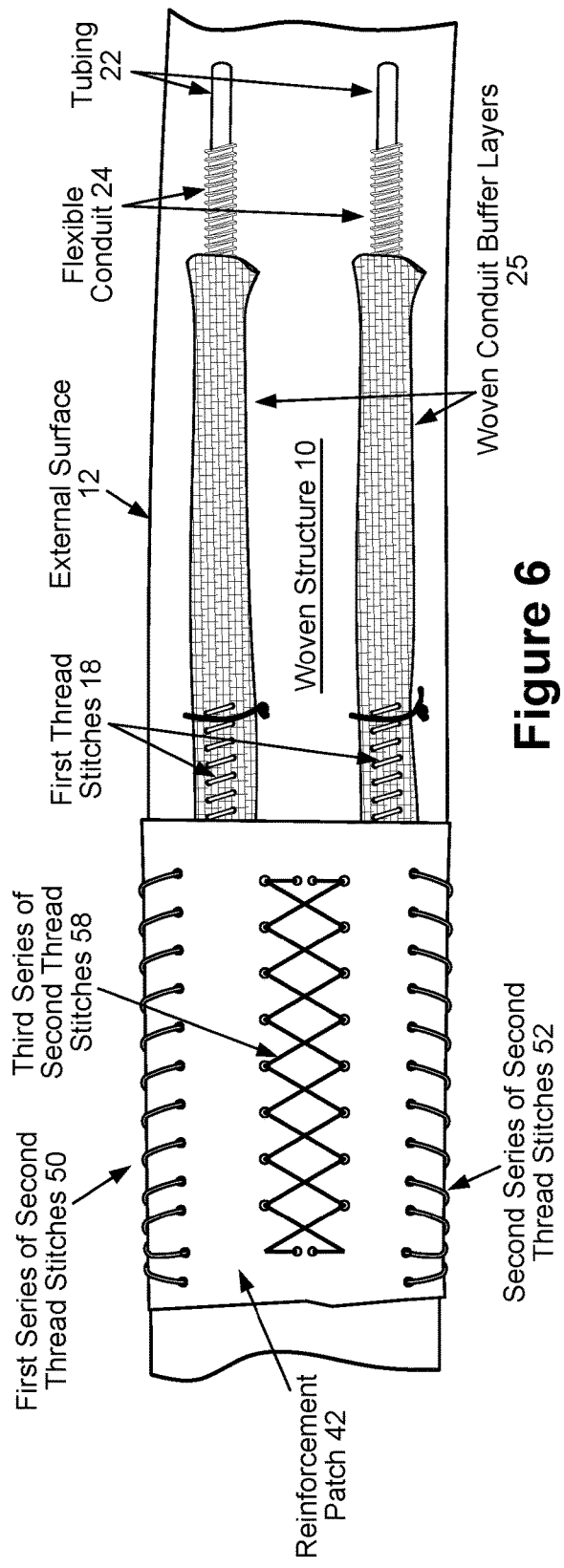
FIG. 6 shows a top view of two example fiber optic sensors embedded in a flexible woven structure egressing from the flexible woven structure as in FIG. 8 and including reinforcement patches and additional, third thread stitches according to a further example egress and/or ingress ruggedization embodiment.

FIG. 6 shows a further example egress and/or ingress ruggedization embodiment with a top view of two example fiber optic sensors embedded in a flexible woven structure egressing from the flexible woven structure as in FIG. 5 with the addition of reinforcement patch 42 (and optional bottom patch 44 if used) and a third series of second thread stitches 58 made through the reinforcement patch 42 (and optional bottom patch 44 if used) in between the two protective conduits over and other either side of the egress and/or ingress location 14 as in FIG. 4. The reinforcement patch(es) 42 (and optional 44 if used) stiffen the egress and/or ingress region relative to the rest of the woven structure 10 while still maintaining some flexibility the egress and/or ingress region.

The various two fiber optic sensor example embodiments shown in FIGS. 3A, 3B, and 4-6 may also be used for three or more fiber optic sensors embedded in the flexible woven structure 10. Although they are shown parallel to each other, the sensors do not need to be.

Figure 7:
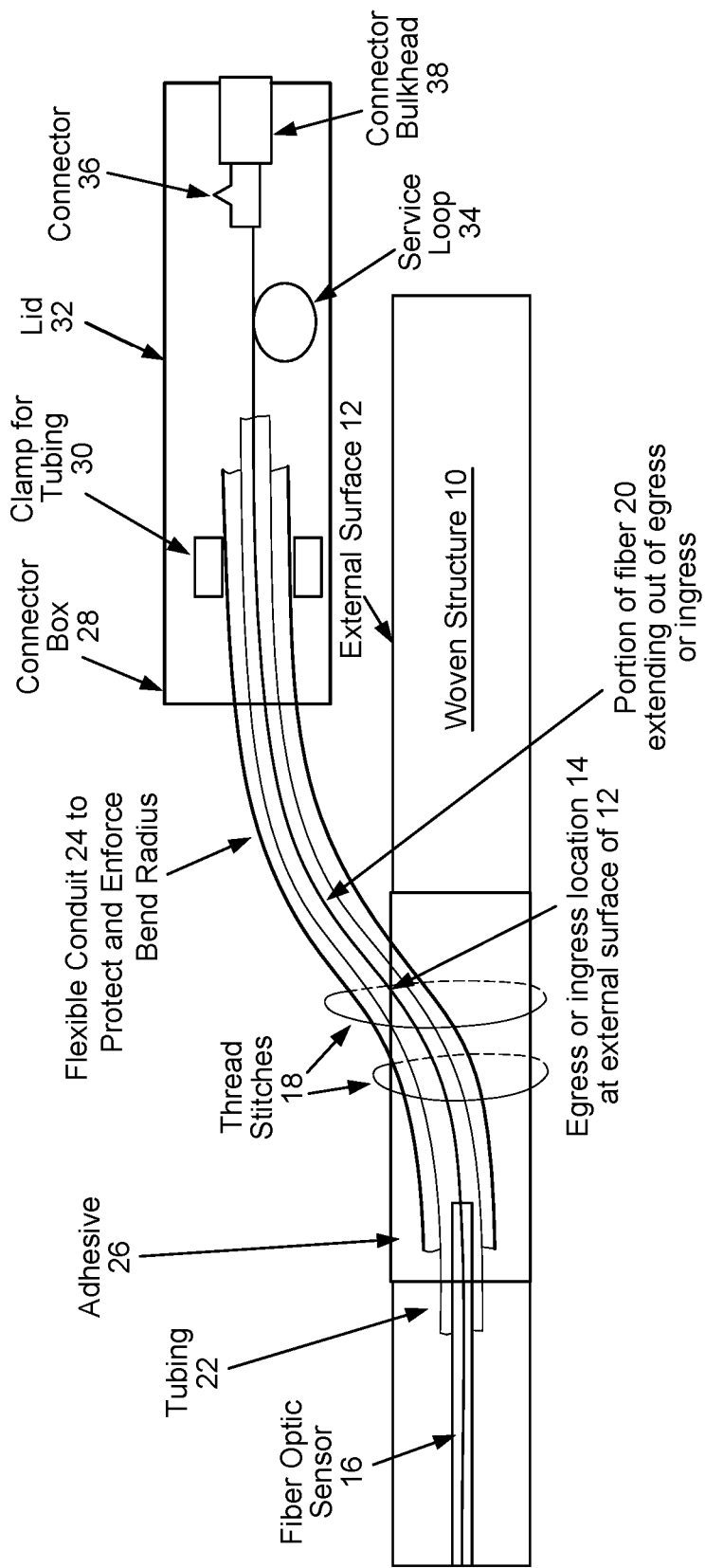
FIG. 7 shows a sideview of an example fiber optic sensor embedded in a flexible woven structure egressing from the flexible woven structure and connecting to a connector box according to an example egress and/or ingress ruggedization embodiment; Protective tubing over the sensor extend through the egress and/or ingress point into the flexible woven structure.

Another example egress and/or ingress ruggedization embodiment is illustrated in FIG. 7. FIG. 7 is a sideview of a fiber optic sensor 16 embedded in a flexible woven structure 10 and egressing from the flexible woven structure 10 and connecting to a connector box 28. The egress and/or ingress occurs approximately at an egress and/or ingress location 14 on an external surface 12 of the woven structure 10. The fiber optic sensor 16 may insert into optional tubing 22, and the tubing may insert into optional flexible protective conduit 24 that protects and enforces a bend radius for a portion 20 of the fiber extending out of the egress and/or ingress. The flexible conduit may be made of any rugged material, like stainless steel, another metal, or a polymer, that restricts the bend radius and avoids crushing the fiber optic sensor 16. The tubing may be made of Teflon or other suitable material, such as for example silicone, polyethylene, or urethane, that allows for axial strain relief for the fiber optic sensor 16.

In this example embodiment, a portion of the fiber, tubing 22, and protective conduit 24 is bonded to an adhesive portion 26 of the woven structure 10 on both sides of the egress and/or ingress location 12 with infused adhesive, e.g., urethane adhesive, or other bonding material such as described above, to reinforce the egress and/or ingress of the fiber optic sensor and maintain the integrity of the fiber optic sensor 16.

The protective conduit 24 is secured to the connector box 28, e.g., made of a protect material such as aluminum, using a clamp 30 to prevent axial loads from being transferred to the optic fiber sensor 16. The fiber optic sensor 16 includes a service loop 34 before being inserted into an optical connector 36 fastened to a connector bulkhead 38. A lid 32 covers the connector box 28 to protect the various elements inside the connector box 28.

First thread stitches 18 encircle the flexible protective conduit 24 along the portion of the conduit that is embedded in the woven structure 10 and extends from the egress and/or ingress location 14 out of the woven structure 10. The first thread stitches 18 may be made by hand or by machine, and the number of stitches is sufficient to securely fasten the flexible protective conduit 24 to the external surface 12 of the woven structure 10. The stitching material may be for example Nylon, Kevlar, Or Vectran thread. Other suitable materials for the stitching threads may be used, and other stitching patterns may be used.

Figure 8:
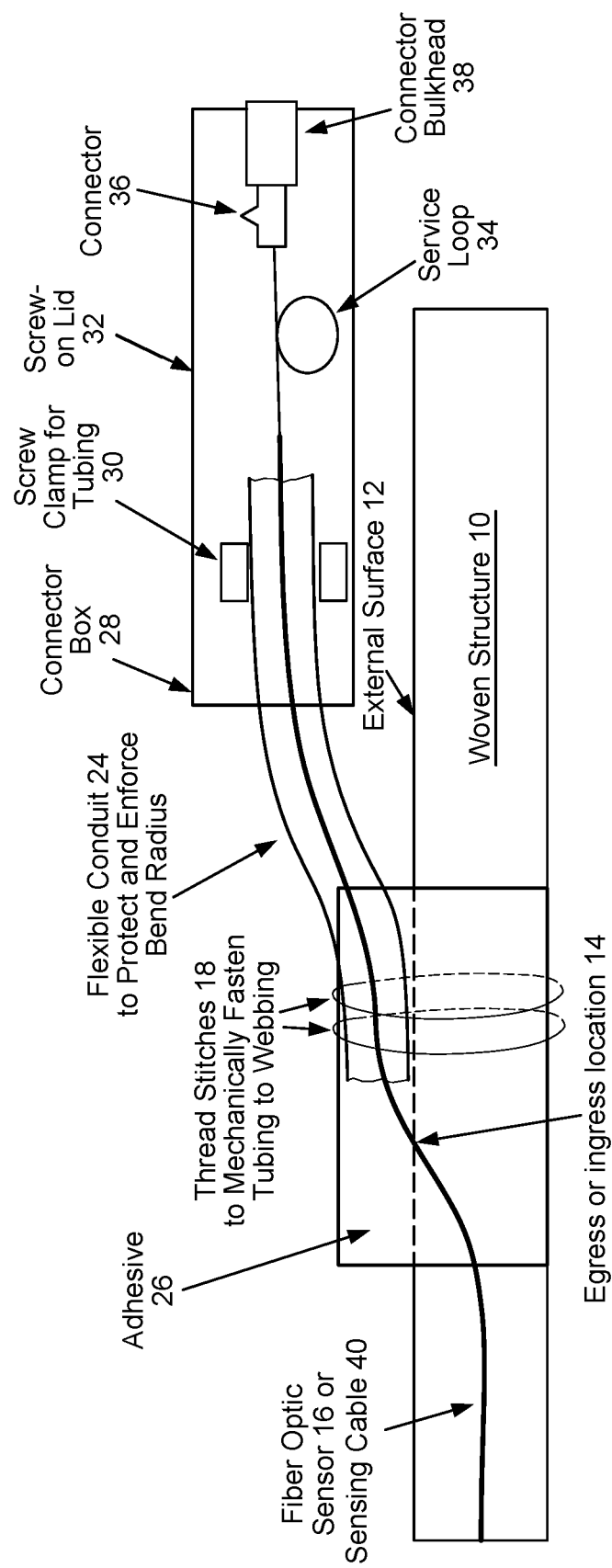
FIG. 8 shows a sideview of an example fiber optic sensor embedded in a flexible woven structure egressing from the flexible woven structure and connecting to a connector box according to another example egress and/or ingress ruggedization embodiment.

FIG. 8 shows a sideview of an example fiber optic sensor embedded in a flexible woven structure egressing from and/or ingressing to the flexible woven structure and connecting to a connector box according to another example egress and/or ingress ruggedization embodiment that is similar to the example embodiment shown in FIG. 7. However, in FIG. 8, no flexible conduit 24 or tubing 22 is embedded in the woven structure 10, and an adhesive portion 26 extends above the external surface 12 to attach the flexible conduit 24 to the woven structure 10. The fiber optic sensor 16 extends out from the egress and/or ingress location 14 and then inserts into the flexible protective conduit 24. Like the example embodiment in FIG. 7, the conduit 24 is bonded with adhesive and fastened to the external surface 12 with first thread stitches 18 encircling the flexible protective conduit 24. Unlike the example embodiment in FIG. 7, the tubing 22 is not used and the flexible protective conduit 24 in FIG. 8 is not embedded in any part of the woven structure. The example embodiment in FIG. 8 may be preferred if the diameter of the fiber optic sensor 16 or cable 40 is relatively large or if the sensor 16 or cable 40 is deemed rugged enough that extra protection at the egress/ingress location 14 is not necessary.

The example embodiments shown in FIGS. 1-8 were subjected to various bending, crushing, pulling, and folding tests and the integrity of the optic fiber sensor 16 was advantageously maintained. The example embodiments shown in FIGS. 1-6 performed better on these tests. For example, when the example embodiments shown in FIGS. 7 and 8 were subjected to destructive tensile test, the woven structure 10 failed earlier than expected. Follow-up tensile tests of the woven structure 10 with the egress and/or ingress embodiments shown in FIGS. 7 and 8 showed a strength reduction of the woven structure in the egress and/or ingress region that was a worse than the strength reduction of the woven structure in the egress and/or ingress region for the egress and/or ingress embodiments in FIGS. 1-6.

Figure 9:
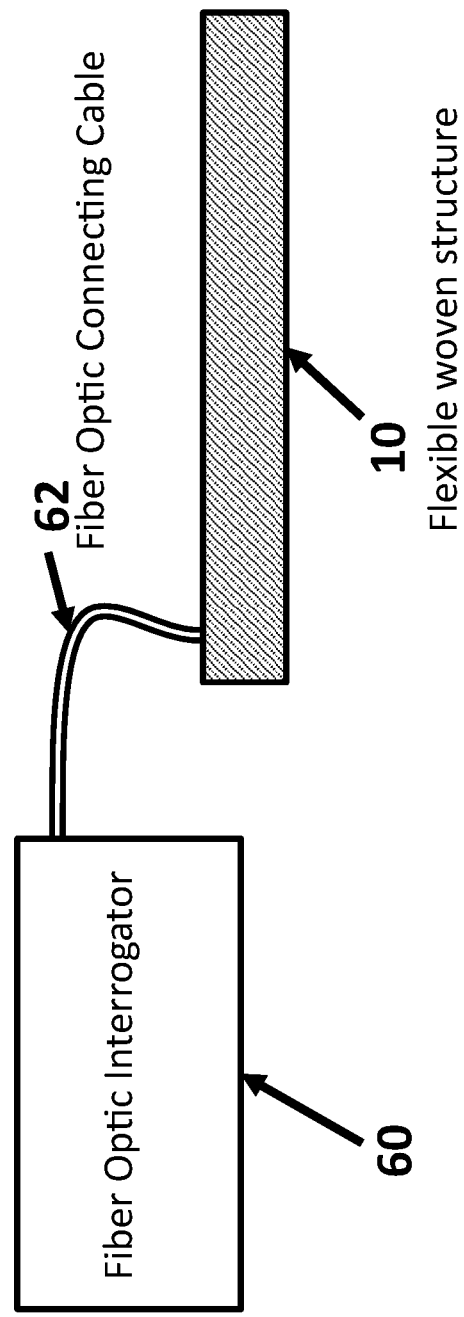
FIG. 9 shows an example sensing system including a fiber optic interrogator coupled to a fiber optic sensor egressed from a flexible woven structure according to certain example embodiments.

FIG. 9 shows an example sensing system including a fiber optic interrogator 60 coupled via a fiber optic connecting cable 62 to the fiber optic sensor 16 (not shown) egressed from the flexible woven structure 10 according to certain example embodiments. The fiber optic interrogator 60 may, for example, measure one or more of strain, temperature, vibration, acoustics, 3-dimensional shape, and/or pressure in the woven structure 10. An example embodiment uses an optical frequency domain reflectometry (OFDR) interrogator to make many distributed measurements throughout the fiber optic sensor 16. OFDR can operate on the Rayleigh backscatter from the fiber optic sensor or on reflections from fiber Bragg grating (FBG) arrays. Other fiber optic strain measurement techniques may employ Raman scatter, Brillouin scatter, FBG point sensors, distributed FBG sensors, etc., and may localize the sensor strain information using time gating methods such as optical time domain reflectometry (OTDR) or wavelength division multiplexing (WDM).

The fiber optic interrogator 60 provides discrete or continuous strain measurements along the longitudinal axis of the fiber. In a preferred but still example embodiment, the fiber optic interrogator 60 uses OFDR interrogation to acquire high spatial resolution data from one or more fiber optic sensors aligned with the woven structure's axial direction. The strain measured in this axial direction by the fiber optic interrogator 60 can be correlated to load applied based on the elastic modulus of the woven structure 10 (relating stress and strain) and/or calibration of strain detected as a function of tension force applied.

The strain measurement signal can be used to detect damage to the woven structure 10 based on identifiable features in the strain signal that are different than the strain signal due to tension. One example mode of damage detection is strength loss detection which is detectible as a change in modulus of the woven structure 10. When the woven structure 10 is incorporated in an inflatable structure, for example, the axial strain can be correlated to the pressure of inflation through calibration. In addition, woven structures often experience creep deformation when load is applied over a certain time period. Creep in a woven strap manifests in the acquired strain signal as a slowly growing magnitude of tensile strain. Bending of the woven structure 10 can be sensed when two or more sensors or two or more sensor paths of a single sensor are offset from a neutral plane of the woven structure. When the woven structure bends, one of the fiber optic sensors or sensor paths is in compression while an opposite path is in tension. This sensor response can be calibrated to detect curvature or angle of bending of the woven structure. When the fiber optic sensor is not located on the neutral plane of the woven structure, or oscillates above and below the neutral plane (e.g., woven over and under weft wovens), a single fiber optic sensor's distributed strain signal exhibits periodic sections of compression and tension. The magnitude of these signals can be calibrated to the amount of curvature or angle of bending of the woven structure in the out-of-plane direction.

Figure 10:
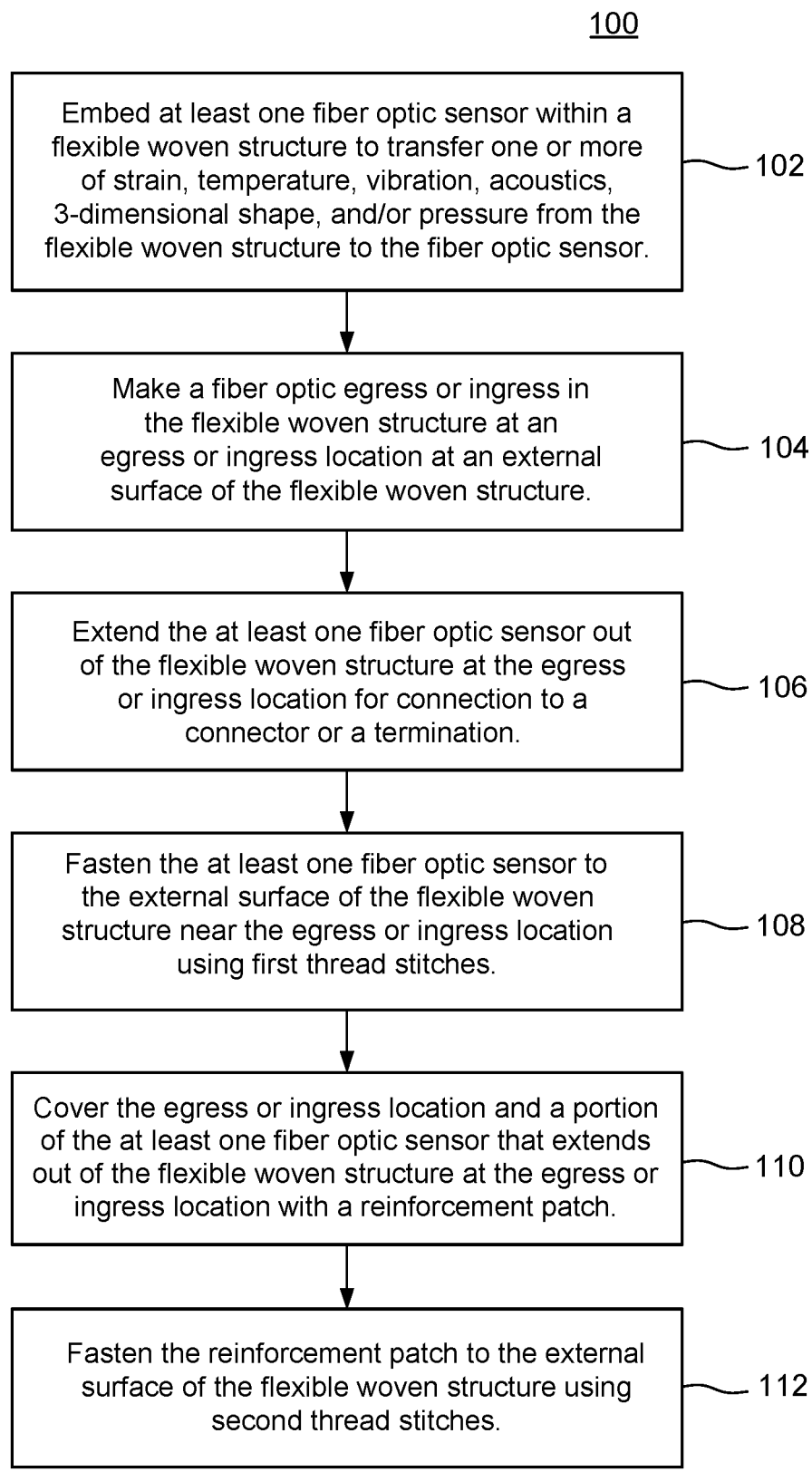
FIG. 10 shows example procedures for ruggedly egressing/ingressing an embedded fiber optic sensor from a flexible woven structure according to certain example embodiments.

FIG. 10 shows example procedures 100 for ruggedly egressing/ingressing an embedded fiber optic sensor from/into a flexible woven structure according to certain example embodiments. In step 102, at least one fiber optic sensor is embedded within a flexible woven structure to detect one or more of strain, temperature, vibration, acoustics, 3-dimensional shape, and/or pressure in the flexible woven structure. In step 104, a fiber optic egress and/or ingress is made in the flexible woven structure at an egress and/or ingress location at an external surface of the flexible woven structure. The egress/ingress could be formed during manufacturing or as a post process. In step 106, the at least one fiber optic sensor extends out of the flexible woven structure at the egress and/or ingress location for connection to a connector or a termination. Although not illustrated in FIG. 10, additional steps may be performed to add optional protective coatings, tubing, and/or conduits such as in example embodiments described above. In step 108, the at least one fiber optic sensor is fastened to the external surface of the flexible woven structure near the egress and/or ingress location using first thread stitches. In step 110, the egress and/or ingress location and a portion of the at least one fiber optic sensor that extends out of the flexible woven structure at the egress and/or ingress location are covered with a reinforcement patch. In step 112, the reinforcement patch is fastened to the external surface of the flexible woven structure using second thread stitches.

FIG. 11 shows an example woven structure 10 that includes a first layer 117 of axial wovens 113 and lateral wovens 114 and a second layer 118 of axial wovens 113 and lateral wovens 114 on opposite sides of a neutral plane for out-of-plane bending 119. Axial wovens are structural members of the woven structure 10, and lateral wovens 114 pass back and forth to hold the axial wovens 113 in place. Vertical binder filaments 115 extend to couple and hold together vertically the first layer 117 and the second layer 118. One or more fiber optic sensors 16 or cables 40 are embedded between the first layer and the second layer in the axial channels between the vertical binder filaments 115. When there is no fiber optic sensor 16 or cable 40 populating the channel, an optional axial stuffer filament may be inserted. If multiple fiber optic sensors 16 or cables 40 are used in the woven structure 10, then each is typically separated by vertical binder filaments 115 and/or axial stuffer filament 116, but multiple sensors 16 or cables 40 may populate a single axial channel between the first layer 117 and bottom layer 118.

Non-limiting example applications for ruggedly egressing/ingressing an embedded fiber optic sensor from/into a flexible woven structure may include: distributed strain measurement in webbing/straps/belts; structural health monitoring of webbing/straps/belts; distributed strain measurement in fabric; structural health monitoring of fabric; structural health monitoring of inflatable structures constructed from flexible woven materials with embedded sensors; temperature sensing of flexible woven structures; temperature sensing of inflatable structures; vibration and/or distributed acoustic sensing of woven structures; vibration and/or distributed acoustic sensing of inflatable structures; pressure sensing of inflatable structures constructed from flexible woven materials with embedded sensors; creep sensing of flexible woven structures; load sensing of flexible woven structures; and bending measurement of flexible woven structures.

Although the present disclosure has been described with reference to particular example embodiments and examples, it will be appreciated by those skilled in the art that the disclosure may be embodied in many other forms and is not limited to particular embodiments and examples.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

All methods described herein can be performed in any suitable order unless otherwise indicated herein. The use of any and all examples, or example language (e.g., "such as") provided herein, is intended merely to better illuminate the example embodiments and does not pose a limitation on the scope of the claims appended hereto unless otherwise claimed.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

What is claimed is:

1. An apparatus comprising:
   a flexible woven structure including an egress and/or ingress location at an external surface of the flexible woven structure;
   a fiber optic sensor embedded in the flexible woven structure to allow the fiber optic sensor to detect one or more of strain, temperature, vibration, acoustics, 3-dimensional shape, and/or pressure on the flexible woven structure, where the fiber optic sensor extends out of the flexible woven structure at the egress and/or ingress location for connection to a connector or a termination;
   first thread stitches that fasten the fiber optic sensor to the external surface of the flexible woven structure near the egress and/or ingress location;
   a reinforcement patch covering the egress and/or ingress location and a portion of fiber optic sensor that extends out of the flexible woven structure at the egress and/or ingress location; and
   second thread stitches that fasten the reinforcement patch to the external surface of the flexible woven structure.

2. The apparatus in claim 1, wherein at least some of the first thread stitches encircle a portion of the fiber optic sensor and a portion of the flexible woven structure near the egress and/or ingress location and/or.

3. The apparatus in claim 1, wherein the reinforcement patch extends beyond the egress and/or ingress location in opposite directions along a length of the flexible woven structure.

4. The apparatus in claim 3, wherein at least some of the second thread stitches secure but do not encircle the fiber optic sensor and the flexible woven structure and at least some other of the second thread stitches secure but do not encircle a portion of the flexible woven structure before the fiber optic sensor egresses from the egress and/or ingress location.

5. The apparatus in claim 3, wherein at least some of the second thread stitches encircle the fiber optic sensor and the flexible woven structure and at least some other of the second thread stitches encircle a portion of the flexible woven structure before the fiber optic sensor egresses from the egress and/or ingress location.

6. The apparatus in claim 3, wherein the second thread stitches include a first series of second thread stitches attaching the reinforcement patch to the external surface of the flexible woven structure on one side of the fiber optic sensor and a second series of second thread stitches attaching the reinforcement patch to the external surface of the flexible woven structure on an opposite side of the fiber optic sensor.

7. The apparatus in claim 1, further comprising a protective conduit,
   wherein the fiber optic sensor extends out of the flexible woven structure at the egress and/or ingress location into the protective conduit, and
   wherein at least some of the first thread stitches encircle a portion of the protective conduit, the fiber optic sensor, and the flexible woven structure near the egress and/or ingress location.

8. The apparatus in claim 7, further comprising a buffer layer between the protective conduit and a portion of the external surface of the flexible woven structure near the egress and/or ingress location,
   wherein at least some of the first thread stitches encircle a portion of the protective conduit, the fiber optic sensor, the buffer layer, and the flexible woven structure near the egress and/or ingress location.

9. The apparatus in claim 7, further comprising tubing, wherein a portion of the embedded fiber optic sensor is encased in the tubing and extends through the egress and/or ingress location and into the protective conduit.

10. The apparatus in claim 1, further comprising a bottom reinforcement patch located on an opposite surface of the flexible woven structure opposite to the external surface and substantially overlapping the reinforcement patch,
    wherein at least some of the second thread stitches encircle each of the reinforcement patches and the flexible woven structure on either side of the egress and/or ingress location.

11. The apparatus in claim 1, wherein:
    the fiber optic sensor includes two or more optical fibers embedded within the flexible woven structure along two or more axes of the flexible woven structure,
    each optical fiber extends out of the flexible woven structure at a corresponding egress and/or ingress location for connection to a connector or a termination,
    the first thread stitches fasten each optical fiber to the external surface of the flexible woven structure near its corresponding egress and/or ingress location, and
    the reinforcement patch covers the corresponding egress and/or ingress locations for each optical fiber and a portion of each optical fiber that extends out of the flexible woven structure at its corresponding egress and/or ingress location.

12. The apparatus in claim 11, wherein the first thread stitches encircle a portion of each optical fiber and the flexible woven structure near the egress and/or ingress location.

13. The apparatus in claim 11, wherein the second thread stitches include a first series of second thread stitches attaching the reinforcement patch to a longitudinal edge of the flexible woven structure, a second series of second thread stitches attaching the reinforcement patch to an opposing longitudinal edge of the flexible woven structure, and a third series of second thread stitches attaching the reinforcement patch to a portion of the flexible woven structure between optical fibers.

14. The apparatus in claim 1, wherein the flexible woven structure includes one or more of: Kevlar, Vectran, Nylon, Polyester, cotton, other synthetic, and organic-based fibers.

15. The apparatus in claim 1, wherein the woven structure includes a first layer of axial wovens and lateral wovens and a second layer of axial wovens and lateral wovens, wherein the vertical wovens extend to couple the first layer and the second layer, and wherein one or more fiber optic sensors are embedded between the first layer and the second layer.

16. A system comprising:
    a flexible woven structure including an egress and/or ingress location at an external surface of the flexible woven structure;
    a fiber optic sensor embedded in the flexible woven structure to detect one or more of strain, temperature, vibration, acoustics, 3-dimensional shape, and/or pressure on the flexible woven structure, where the fiber optic sensor extends out of the flexible woven structure at the egress and/or ingress location for connection to a connector or a termination;
    first thread stitches that fasten the fiber optic sensor to the external surface of the flexible woven structure near the egress and/or ingress location;

a reinforcement patch covering the egress and/or ingress location and a portion of fiber optic sensor that extends out of the flexible woven structure at the egress and/or ingress location;

second thread stitches that fasten the reinforcement patch to the external surface of the flexible woven structure; and a fiber optic interrogator optically coupled to the fiber optic sensor and configured to measure strain, temperature, vibration, acoustics, 3-dimensional shape, and/or pressure.

17. The system in claim 16, wherein the fiber optic interrogator is configured to use one or more of: Rayleigh scatter, Raman scatter, Brillouin scatter, FBG point sensors, distributed FBG sensors to measure one or more of strain, temperature, vibration, acoustics, 3-dimensional shape, and/or pressure applied to the fiber optic sensor.

18. The system in claim 16, wherein the fiber optic interrogator is an optical frequency domain reflectometry (OFDR)-based interrogator to measure one or more of strain, temperature, vibration, acoustics, 3-dimensional shape, and/or pressure with high spatial resolution based on light reflections from Rayleigh scatter and/or from fiber Bragg gratings (FBG) in the fiber optic sensor.

19. The system in claim 16, wherein the fiber optic interrogator is configured to determine distributed strain along a longitudinal axis of the flexible woven structure and to determine from the distributed strain one or more of the following: an applied load to the flexible woven structure, damage to the flexible woven structure, pressure on the flexible woven structure, a material creep of the flexible woven structure, in-plane and/or out-of-plane bending or curvature of the flexible woven structure, and a direction of damage to the flexible woven structure.

20. A method comprising:
embedding at least one fiber optic sensor within a flexible woven structure to detect one or more of strain, temperature, vibration, acoustics, 3-dimensional shape, and/or pressure on the flexible woven structure;

making a fiber optic egress and/or ingress in the flexible woven structure at an egress and/or ingress location at an external surface of the flexible woven structure;

extending the at least one fiber optic sensor out of the flexible woven structure at the egress and/or ingress location for connection to a connector or a termination;

fastening the at least one fiber optic sensor to the external surface of the flexible woven structure near the egress and/or ingress location using first thread stitches;

covering the egress and/or ingress location and a portion of the at least one fiber optic sensor that extends out of the flexible woven structure at the egress and/or ingress location with a reinforcement patch; and fastening the reinforcement patch to the external surface of the flexible woven structure using second thread stitches.

21. The method in claim 20, further comprising:
generating the flexible woven structure using axial wovens, lateral wovens, and vertical wovens, where the woven structure includes a first layer of axial wovens and lateral wovens and a second layer of axial wovens and lateral wovens and the vertical wovens extend to couple the first layer and the second layer, and embedding one or more fiber optic sensors between the first layer and the second layer.

* * * * *